United States Patent
Mack et al.

[11] Patent Number: 6,158,164
[45] Date of Patent: Dec. 12, 2000

[54] AERODYNAMIC WEIGHTED FISHING BOBBER

[76] Inventors: Kenneth Richard Mack, N12095 Selmer Rd., Tomahawk, Wis. 54487; Eugene Joseph Rozmenoski, 1126 N. 10$^{th}$ Ave., Wausau, Wis. 54401

[21] Appl. No.: 09/301,169

[22] Filed: Apr. 28, 1999

Related U.S. Application Data

[63] Continuation of application No. 08/868,268, Jun. 3, 1997, abandoned.

[51] Int. Cl.$^7$ .................................................. A01K 93/00
[52] U.S. Cl. ............................................................ 43/44.95
[58] Field of Search ................. 43/44.87, 44.9, 43/44.91, 44.94, 44.95

[56] References Cited

U.S. PATENT DOCUMENTS

| | | | |
|---|---|---|---|
| 668,254 | 2/1901 | Dickinson | 43/44.9 |
| 1,934,845 | 11/1933 | Durham | 43/44.95 |
| 2,181,458 | 11/1939 | La Gue | 43/44.87 |
| 2,547,308 | 4/1951 | Dean | 43/44.87 |
| 2,699,624 | 1/1955 | Vawryk | 43/44.87 |
| 3,204,363 | 9/1965 | Dunham | 43/44.95 |
| 3,423,776 | 1/1969 | Beyer-Olsen et al. | 43/44.9 |
| 3,760,527 | 9/1973 | Hamren | 43/44.91 |
| 3,832,795 | 9/1974 | Wolfe | 43/44.9 |
| 3,866,346 | 2/1975 | Schneider | 43/44.87 |
| 4,300,304 | 11/1981 | Maycock et al. | 43/44.87 |
| 4,827,655 | 5/1989 | Reed | 43/17.5 |
| 4,845,885 | 7/1989 | Rubbelke | 43/44.95 |
| 4,916,850 | 4/1990 | Dodge | 43/44.91 |
| 5,129,178 | 7/1992 | Hicks | 43/44.87 |
| 5,231,787 | 8/1993 | Chuang | 43/44.87 |
| 5,235,777 | 8/1993 | Burns | 43/44.91 |
| 5,243,780 | 9/1993 | Christensen | 43/44.87 |
| 5,329,722 | 7/1994 | Wilson | 43/44.94 |
| 5,359,804 | 11/1994 | Burns | 43/44.91 |
| 5,361,532 | 11/1994 | Moff | 43/44.9 |
| 5,412,902 | 5/1995 | Hicks | 43/44.87 |
| 5,713,152 | 2/1998 | Domack | 43/44.95 |
| 5,737,868 | 4/1998 | Rikard | 43/44.92 |

OTHER PUBLICATIONS

Blue Fox Tackle Co., Cambridge, MN; package literature from Firefly® Lighted Float, product barcode#27752–80301, copyright 1995 Blue Fox Tackle Co., publication date unknown.

*Primary Examiner*—Darren Ark

[57] ABSTRACT

A fishing bobber for releasable attachment to fishing line comprising a forward and a rearward portion forming a buoyant member with an elongated staff on a forward end and an aerodynamic fairing on a rearward end with all elements aligned along a longitudinal axis. There is present an integral weight cast into the forward portion. Both portions and the weight are cast from similar material in a common mold. The bobber is provided with weight and an aerodynamic form to promote casting distance. The bobber assumes a horizontal position upon the surface of the water and is capable of accepting metallic lures of minimal weight while remaining in a horizontal attitude on the water, thereby maintaining a high degree of sensitivity inherent in a fishing bobber of elongated design.

20 Claims, 3 Drawing Sheets

AERODYNAMIC WEIGHTED FISHING BOBBER

CROSS REFERENCE TO RELATED APPLICATIONS

This application is a continuation of U.S. patent application Ser. No. 08/868,268, filed Jun. 3, 1997, now abandoned.

STATEMENT REGARDING FEDERALLY SPONSORED RESEARCH OR DEVELOPMENT

Not Applicable

BACKGROUND

The invention pertains to fish strike indicators and particularly to weighted fishing bobbers of aerodynamic design lying in a horizontal position on the water when in normal use.

Fishing bobbers of many descriptions from simple dry twigs to elaborate multi-purpose designs are known in the prior art. The simplest manufactured bobbers are spheroid or ellipsoid models made of cork or foam with some simple means to hold the bobber to the line. A representative of these types is recited in U.S. Pat. No. 668,254 issued on Feb. 19, 1901 to C. W. Dickinson. These simple bobbers suffer from two common deficiencies; they are too lightweight to be cast any distance and they usually indicate a fish strike only when pulled completely underwater by the fish, hence a fish feels resistance equal to the total amount of water displaced by the submerged bobber. This can be detrimental to fish of small size commonly sought by many anglers as table fare. The artificial feel of the bait or lure may cause these fish to turn from the hook.

A second class of bobbers is those of elongate design, commonly known as stick bobbers or pencil bobbers. An example is described in U.S. Pat. No. 5,412,902 issued May 9, 1995 to T. W. Hicks. Stick or pencil bobbers suffer from the same deficiencies as round or oval bobbers in that their lack of weight limits casting distance and their need to submerge a relatively large highly buoyant body before the strike is indicated may decrease the willingness of the fish to take the bait.

A third type of bobber uses a metal additive generally in the form of lead as weight to promote casting distance. An example is U.S. Pat. No. 4,845,885, issued Jul. 11, 1989 to I. L. Rubbelke. This bobber has a metal washer internal to its body and, being a dissimilar material, involves a step in the manufacturing process that can be eliminated through the use of similar materials as the weight additive.

A need is present for a simply made fishing bobber capable of casting distance greatly exceeding similar bobbers, thereby greatly enlarging the angler's fishing area, and hence, his enjoyment of the pastime and yet maintaining a controllable sensitivity to fish strikes to enable an angler to catch fish when those fish might otherwise shy away from the bait.

OBJECTS OF THE INVENTION

Accordingly, an object of the invention is to provide a weighted bobber providing a potential casting distance much further than prior art products, thereby greatly expanding the angler's potential fishing area from boat or shore.

Another object is to provide an aerodynamic form to the invention that promotes the flight path of a cast by reducing distance limiting turbulence and that also corrects the flight path of an improperly thrown cast by reducing and eliminating distance limiting oscillation.

Another object is to provide an extremely sensitive fish strike indicator by coupling a lever arm over an appropriate distance to a central buoyant body, allowing the bobber's resting position, during a fish strike, to change from horizontal to vertical and thereby to detect the least interest in any suspended bait or lure.

A further object of this invention is to provide a simple, low cost, high speed approach to production of the bobber by employing an integrally cast weight formed by an injection molding process, thereby eliminating the production step of adding weight in the form of a dissimilar material Another object is to provide the bobber with a form similar in shape to prior art products in order to maintain the fishing publics' association with and comparison to other bobbers.

A further object is to employ a commonly available fastening device for releasable connection with an anglers' line.

Lastly, an object of the invention is to provide the bobber with an integral colorant visible at the extended distances the invention is capable of reaching.

SUMMARY

Briefly described, the invention entails two portions and apparatus for releasable attachment to a fishing line. The forward portion is comprised of a staff which functions as a fish strike indicator, a generally hollow forward hemisphere joined to the staff through a radiused fairing and an equatorial joint adapted for high speed attachment to a rearward hollow hemisphere. The forward hollow hemisphere has a weight molded into its inner surface. The weight is comprised of semicircular discs molded into a curved inner surface of the forward portion and molded to a sleeve along their straight edges. The discs and the forward and rearward portions are designed to provide rapid cooling during an injection molding process.

The rearward portion is comprised of a second generally hollow hemisphere, unweighted, with an equatorial joint similar to the front portion. There is a generally hollow aerodynamic fairing incorporated into and integral with the second hemisphere and this portion terminates with an attachment apparatus for the fishing line at its extreme end. The two hemispheres, united at their equatorial joints and taken with their fairings, comprise the buoyant member. The buoyant member, taken with the staff and attachment apparatus, comprise the bobber of the invention. The bobber provides aerodynamic stability and low aerodynamic drag during its time in flight. During casts, the front staff and fairing direct the airflow to proceed smoothly over the buoyant member. The aerodynamic fairing incorporated into the rearward portion provides flight stability and low drag through the elimination of oscillating eddies. The bobber leaves the rod tip in a staff forward position and maintains or corrects to that attitude while in the air. The weight provided by the disc array, the centralized location of the weight along the longitudinal axis, and the aerodynamic form provide dramatically increased casting distances.

At the end of its flight, the bobber of this invention lies on the surface of the water in a horizontal position. The fishing line is attached to the extreme end of the rearward portion by a device well-known in the art. The fairing attached to the rearward portion functions as a lever arm pivotal around the buoyant member and acting on the forward staff The pivotal movement of the bobber around its buoyant member provides a fish strike indicator very sensitive to strikes and nibbles.

Figure 1:
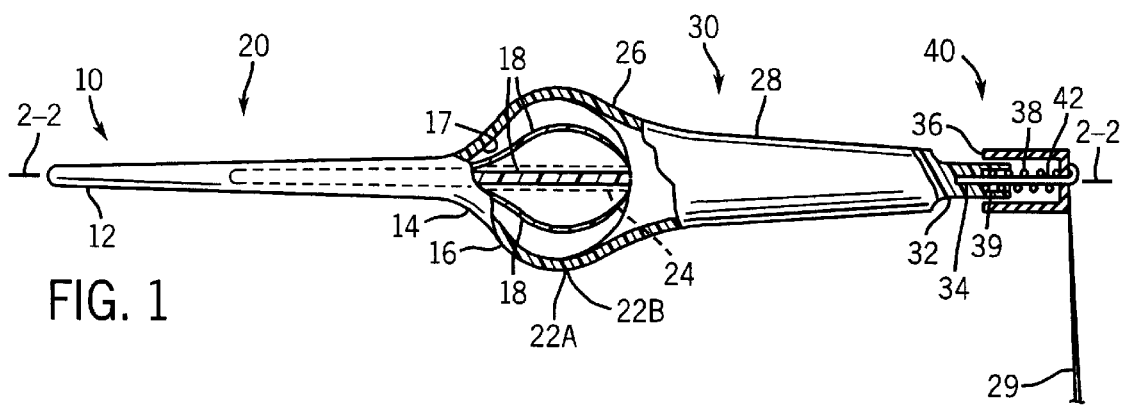
FIG. 1 is a side view of the invention cut-away to show the disc array and extreme end of rearward portion.

The invention is not limited in its application to the details of construction and the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENT

Referring to FIG. 1 of the present invention, the bobber 10 is seen to be comprised generally of a forward portion 20 consisting of an elongated staff 12 and a radiused fairing 14 joined to a generally hollow forward hemisphere 16 containing an integrally molded weight comprised of an array of generally semi-circular discs 18. The staff 12, radiused fairing 14 and forward hemisphere are aligned along the longitudinal axis 2—2. In the preferred embodiment as illustrated, there is a thermal relief aperture 24, shown by dashed lines, concentric to the longitudinal axis 2—2 and shown in FIG. 2B. There is an equatorial joint 22A at the end of the forward portion 20 designed for high-speed attachment to the rearward portion 30 along the longitudinal axis.

The rearward portion 30 is comprised of an equatorial joint 22B adapted for high-speed attachment to the forward portion 20, a rearward hollow hemisphere 26 with an integral aerodynamic fairing 28, shaft 32, hook aperture 34 and spring recess 39. A releasable attachment apparatus 40 at the extreme end of the bobber 10 is comprised of cap 36 spring 38 and hook 42. All are aligned along the longitudinal axis 2—2. The attachment apparatus is known in the art.

The fishing bobber 10 of the present invention is made of a suitable plastic material such as acetal, nylon, polystyrene, polyethylene, polyester or similar material capable of being readily formed by an injection molding process and capable of accepting colorants. It will be appreciated that the forward portion 20, rearward portion 30 and cap 36 can be made from identical material in a common mold.

Figure 2A:
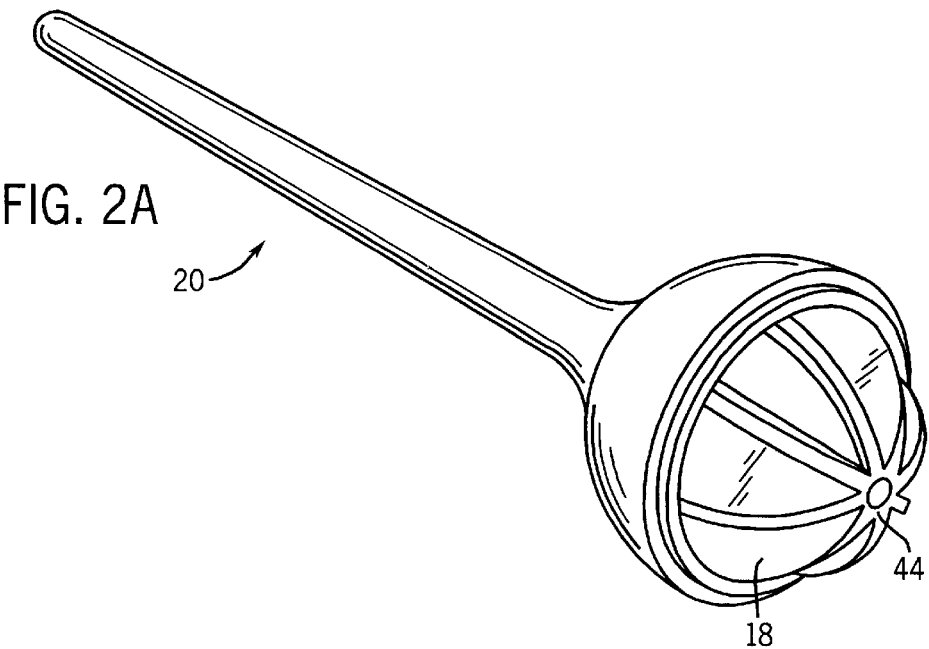
FIG. 2A and FIG. 2B are perspective and cross-sectional views, respectively, of the front portion of the invention.
Figure 2B:
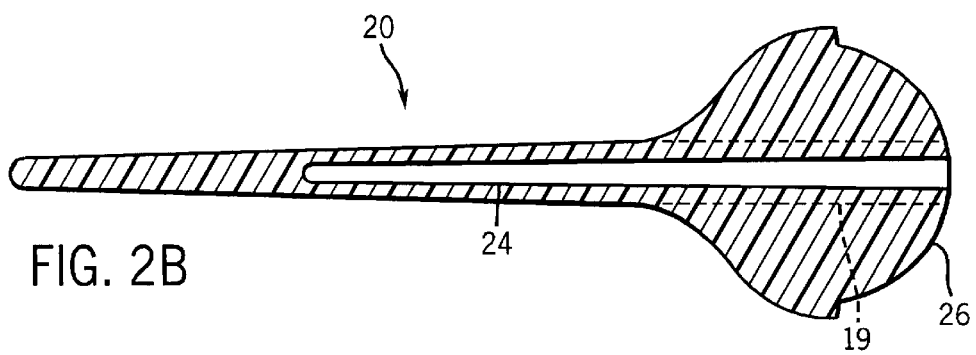

Referring to FIG. 2A, the front portion 20 is shown in perspective view to show disc array 18. The disc array 18 of the preferred embodiment is comprised of a plurality of semi-circular discs molded into and integral with a curved inner surface 17 of the generally hollow forward hemisphere 16 with straight edges 19, shown in FIG. 2B, molded to a generally hollow column 44 concentric to the longitudinal axis 2—2. The disc array 18 can be constructed by a moldmaker competent in the art so as to provide reduced cooling time during the injection molding process and thereby an efficient throughput during that process.

Figure 3A:
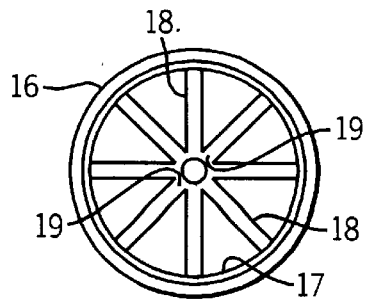
FIG. 3A through FIG. 3G are top views of the invention showing the preferred embodiment and alternate arrangements.
Figure 3B:
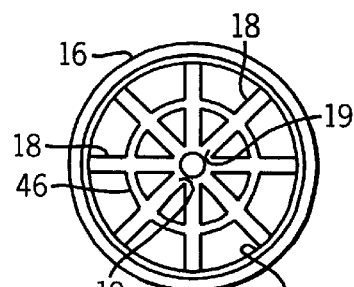
Figure 3C:
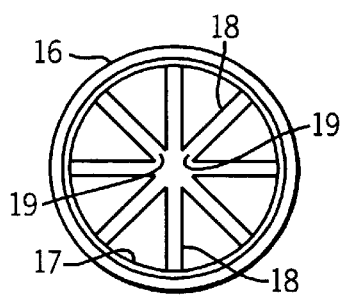
Figure 3D:
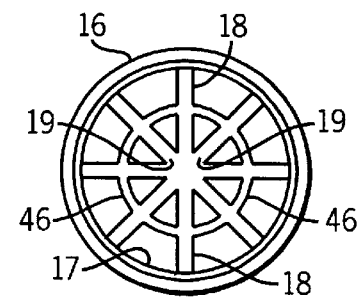

The preferred embodiment of the disc array 18 is shown in FIG. 3A and some alternate arrangements are shown as follows: FIG. 3B with one or more generally hollow sleeves 46 concentric to the longitudinal axis molded into the forward hemisphere 16 and into the disc array 18; FIG. 3C with the hollow sleeve 46 eliminated and the disc array 18 molded together along their straight edges 19 and molded into the forward hemisphere 16; or FIG. 3D, with one or more generally hollow sleeves 46 molded into the disc array 18 of FIG. 3C.

Figure 3E:
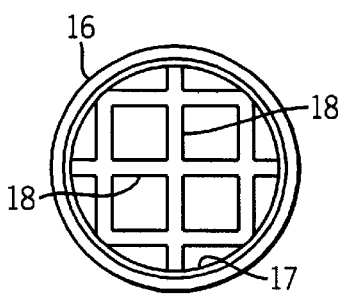
Figure 3F:
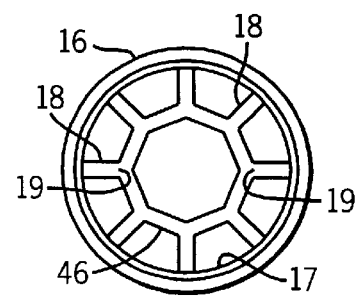
Figure 3G:
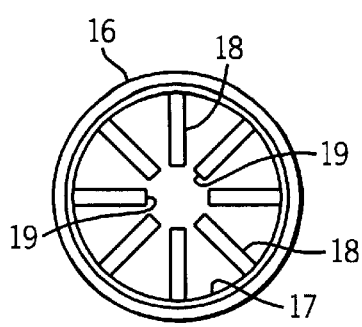

At this point, it may become obvious to an experienced observer that there are many other possible arrays that can provide weight adequate to promote casting distance. An array can be contrived of discs molded at right angles to each other as in FIG. 3E or as an octagonal array FIG. 3F or as equally spaced semicircular discs 18 with straight edges 19 generally parallel to longitudinal axis 2—2 and independent of each other FIG. 3G. A complete description of the myriad arrangements would be unnecessarily burdensome and the authors do not feel compelled to so belabor the examiner. The sample arrays are comprehensively intended to illustrate that weight can be provided by molding material similar to that comprising the forward hemisphere 16 into the inner surface of the forward hemisphere 16.

Figure 4:
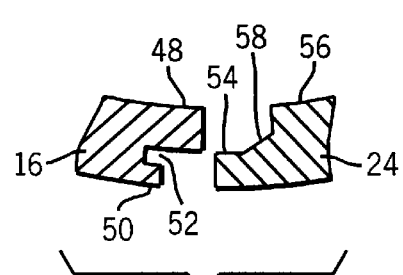
FIG. 4 is a cross-sectional view of the equatorial joint.

Referring to FIG. 4, the equatorial joint 22A and 22B is comprised of an inset annular flange 48 on the end of the forward hemisphere 16. The flange 48 in conjunction with an external annular flange 50 form an annular pocket 52. The rearward hemisphere 26 has an external annular flange 54 leaving a shoulder 56 and providing an angular portion 58 to facilitate bonding of the forward portion 20 to the rearward portion 30 by ultrasonic welding, spin welding, adhesive or chemical bonding, compression fit or means similar in nature.

Figure 5:
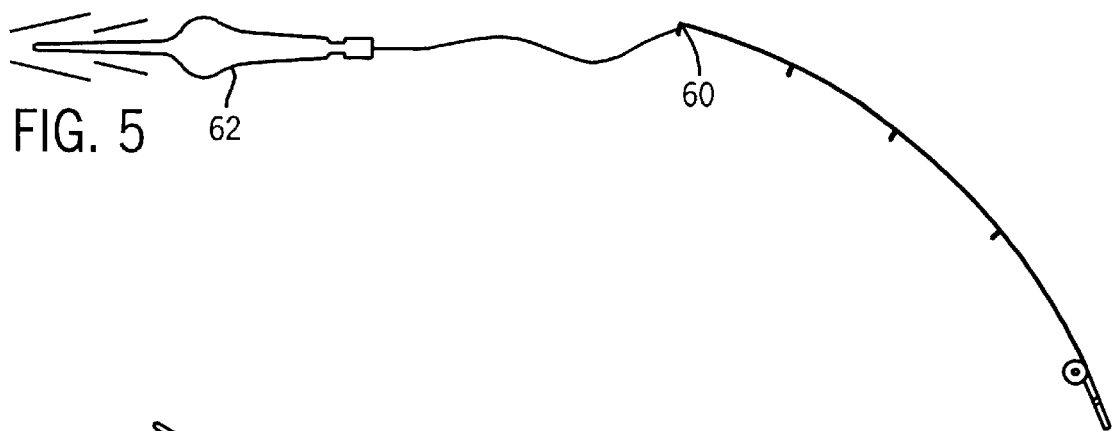
FIG. 5 and FIG. 6A through FIG. 6C depict operation of the invention.

The operation of the invention can be seen in FIG. 5 and appreciated by noting that the bobber 10 with fishing line 29 connected to attachment apparatus 40 at the extreme end of rearward portion 30 leaves the fishing rod tip 60 in a staff forward attitude 62 and is given substantial initial velocity by the angler's actions during casting. In casting any bobber, assuming velocity at rod tip 60 is equal, weighted bobbers and particularly the bobber 10 of the invention, have momentums higher than unweighted bobbers and, if the bobbers were of the same form, those with weight additives would outdistance the unweighted types due to a higher inertia given by the weight additive. It can be demonstrated that a weight additive will approximately double casting distance without changing a bobber's form.

The bobber 10 of the invention goes beyond the simple addition of weight by also providing an aerodynamic form that maintains initial inertia longer than other bobbers. By reducing the aerodynamic drag inherent to a body moving at speed through the air, the bobber 10 of the invention is able to exceed casting distances of similar weighted bobber by 50% or greater.

The bobber 10 of the invention's self-correcting aerodynamic performance is directly related to three physical characteristics;

1. a narrow staff 12 of insignificant weight and aerodynamic drag. The staff 12 used as the fish strike indicator has a weight less than 10% of the total bobber weight. The average diameter of the staff 12 is generally one-half or less than the smallest diameter of the aerodynamic fairing 28, yielding a cross-sectional area susceptible to drag one-fourth or smaller relative to the fairing 28.
2. a centrally located weight in the form of a disc array 18. The concentration of weight centrally along the longitudinal axis 2—2 provides a large center of mass forward of the aerodynamic fairing 28 and functions as a pivot point between the staff 12 and fairing 28 while the bobber 10 is in flight.

3. an aerodynamic fairing 28 extending rearward of the center of mass. The fairing 28 is generally hollow, with low weight relative to the center of mass and high weight relative to the staff 12. The aerodynamic fairing 28 has significantly greater drag than the staff 12 during an unbalanced condition occurring in a poorly made cast.

Figure 6A:
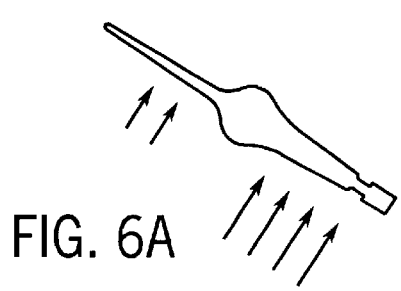
Figure 6B:
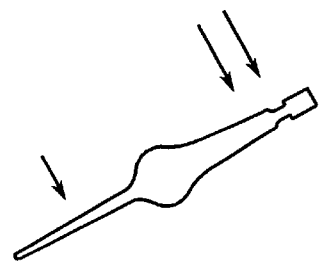
Figure 6C:
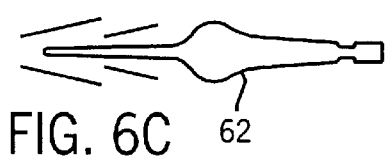

The co-operation of the three above elements allows the bobber 10 to act in a manner similar to a weathervane. A wind force directed angularly at a weathervane pushes its tail section sideways to streamline into the wind. A miscast bobber 10 as shown in FIG. 6A will have an angular alignment to the relative wind. The forces exerted by that wind are represented by the length and number of arrows directed at the fairing 28 and staff 12 in FIG. 6A and FIG. 6B. The larger cross-section of the fairing 28 generates larger lateral force and aerodynamic drag than the narrow staff 12, the fairing 28 thus reacting pivotally around the center of mass given by the disc array 18. The result is a series of diminishing oscillations, with one example shown in FIG. 6B, until the bobber 10 of the invention reaches its natural path of least resistance shown by the staff forward attitude 62 in FIG. 6C. The maintenance of or correction to the staff-forward attitude 62 in FIG. 6C provides dramatically increased casting distances. Routine casts of 50–55 yards or further are reachable by experienced or motivated casters, while distances of 40–45 yards are easily within the grasp of the neophyte angler.

The bobber 10 of the invention exhibits a third and final feature of considerable merit. Sensitivity in fish strike indicators is the ability to minimize a bobber's presence during a fish strike. Bobbers of a spheroid or ovate form with their large displacements are of low sensitivity as the whole form typically needs to be submerged before a fish is deemed to have taken the hook. Elongated bobbers, with their pivotal movement, have the capacity for a high level of sensitivity. However, fishing bobbers of the stick or pencil type in which the bobber 10 belongs are inherently unstable. The stick type, with bulbous bodies and slender sticks protruding from each end, assume an angular position when cast upon the water. The addition of a small sinker, usually in the form of split lead balls, commonly used and required to draw the bait down to its prescribed depth, increase this angular position and reduce a stick bobber's sensitivity and thereby its usefulness. This problem of angularity continues with long narrow pencil bobbers. Aggravating this problem further are the ambient water conditions an angular frequently encounters. Waves generated by wind, current or passing boats cause these elongated bobbers to rock deceptively, sending false signals of a fish's interest in the bait.

The external addition of metal to an elongated bobber, commonly applied some distance from the center and used to promote casting distance, is crippling to an elongated bobber's sensitivity. The off-center metallic additive quickly causes these bobber to assume a vertical position when in use upon the water. The potential for sensitivity available from their elongated form is immediately lost and the fish again needs to submerge a relatively large buoyant body before an angler can become sufficiently confident of that fish's interest in the bait to attempt setting the hook.

Figure 7:
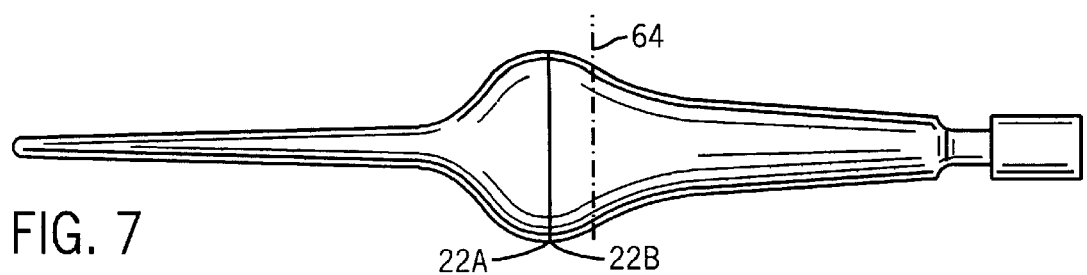
FIG. 7 is a side view of the invention showing an approximate center of gravity.

The bobber 10 of the invention overcomes the handicap of angularity and loss of sensitivity by incorporating a reserve buoyancy into its aerodynamic fairing 28 and providing a center of gravity 64 slightly rearward of the equatorial joint 22A–22B and depicted in FIG. 7. The disc array 18, although centrally located, acts as a counterweight offsetting the addition of minimal weight to the fishing line 29. The capability to carry some minimal weight without assuming an angular or vertical position allows selection of a larger variety of lures such as metallic imitation insects or lead-headed jigs, thereby enhancing an angler's use and enjoyment of the bobber 10.

In the group comprising elongate fishing bobbers with weight additives, the capability to maintain a horizontal attitude upon the water under the above stated condition is an improvement unique to the bobber 10 of the invention Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims may use means plus function language, it is not meant to include there, or in the instant specification, anything not structurally equivalent to what is shown in the embodiments disclosed in the specification.

What is claimed is:

1. A fishing bobber having a longitudinal axis, the fishing bobber comprising:
   a first hemisphere having a first mating surface and a curved inner surface;
   a second hemisphere having a second mating surface wherein the second mating surface mates with the first mating surface to form a buoyant member having a forward portion and a rearward portion;
   an attachment device to which a fishing line may be attached wherein the attachment device is located rearward of the buoyant member; and
   means for weighting the fishing bobber, wherein the means for weighting includes a plurality of disks extending into the buoyant member, and further wherein each of the plurality of disks has a first edge integral with the curved inner surface of the buoyant member and a second edge generally parallel to the longitudinal axis.

2. The fishing bobber of claim 1, wherein the means for weighting the fishing bobber is disposed such that the attitude of the fishing bobber assumes an orientation wherein the forward portion is located forward of the rearward portion during flight of the fishing bobber.

3. The fishing bobber of claim 1 further comprising means for diminishing oscillations during flight of the fishing bobber.

4. A fishing bobber having a longitudinal axis and a center of mass, the fishing bobber comprising:
   a first hemisphere having a first mating surface and a curved inner surface;
   a second hemisphere having a second mating surface wherein the second mating surface mates with the first mating surface to form a buoyant member having a forward portion and a rearward portion;
   an integrally molded weight located within the buoyant member wherein the integrally molded weight includes a plurality of disks extending into the buoyant member, wherein each of the plurality of disks has a first edge integral with the curved inner surface of the buoyant member and a second edge generally parallel to the longitudinal axis; and an attachment device to which a fishing line may be attached wherein the attachment device is located rearward of the buoyant member.

5. The fishing bobber of claim 4 further including a fairing oriented substantially along the longitudinal axis wherein the fairing projects rearward from the rearward portion.

6. The fishing bobber of claim 5 wherein the fairing is disposed to diminish oscillations during flight of the fishing bobber.

7. The fishing bobber of claim 5 wherein the fairing is buoyant.

8. The fishing bobber of claim 5 wherein the integrally molded weight is disposed such that the center of mass is located forward of the fairing.

9. The fishing bobber of claim 4 wherein the integrally molded weight is disposed such that the attitude of the fishing bobber assumes an orientation wherein the forward portion is located forward of the rearward portion during flight of the fishing bobber.

10. The fishing bobber of claim 4 wherein the integrally molded weight further includes at least one sleeve extending along the longitudinal axis.

11. The fishing bobber of claim 4 further comprising a fish strike indicator oriented substantially along the longitudinal axis wherein the fish strike indicator projects forward from the forward portion.

12. The fishing bobber of claim 4 wherein the fishing bobber is adapted to lie on the water with the longitudinal axis in a substantially horizontal position when the fishing bobber is in normal use.

13. A fishing bobber having a longitudinal axis and a center of gravity in water, the fishing bobber comprising:

a first hemisphere having a first mating surface and a curved inner surface;

a second hemisphere having a second mating surface wherein the second mating surface mates with the first mating surface to form a buoyant member having a forward portion and a rearward portion;

an attachment device to which a fishing line may be attached wherein the attachment device is located rearward of the center of gravity in water;

means for offsetting an addition of weight to the fishing line, when attached, whereby the fishing bobber lies on the water with the longitudinal axis in a substantially horizontal position when the fishing bobber is in normal use, and wherein the means for offsetting is located forward of the center of gravity in water, and further wherein the means for offsetting includes a plurality of disks extending into the buoyant member, wherein each of the plurality of disks has a first edge integral with the curved inner surface of the buoyant member and a second edge generally parallel to the longitudinal axis.

14. The fishing bobber of claim 13 further comprising means for providing a reserve buoyancy whereby the fishing bobber lies on the water with the longitudinal axis in a substantially horizontal position when the fishing bobber is in normal use.

15. A fishing bobber having a longitudinal axis and a center of gravity in water, the fishing bobber comprising:

a first hemisphere having a first mating surface and a curved inner surface;

a second hemisphere having a second mating surface wherein the second mating surface mates with the first mating surface to form a buoyant member having a forward portion and a rearward portion;

an attachment device to which a fishing line may be attached wherein the attachment device is located rearward of the buoyant member; and a counterweight wherein the counterweight includes a plurality of disks extending into the buoyant member, wherein each of the plurality of disks has a first edge integral with the curved inner surface of the buoyant member and a second edge generally parallel to the longitudinal axis, and further wherein the counterweight is located forward of the center of gravity in water whereby the counterweight offsets an addition of weight to the fishing line, when attached, such that the fishing bobber lies on the water with the longitudinal axis in a substantially horizontal position when the fishing bobber is in normal use.

16. The fishing bobber of claim 15 further comprising a fairing oriented substantially along the longitudinal axis wherein the fairing projects rearward from the rearward portion and further wherein the fairing is buoyant whereby the fairing provides a reserve buoyancy such that the fishing bobber lies on the water with the longitudinal axis in a substantially horizontal position when the fishing bobber is in normal use.

17. The fishing bobber of claim 16 wherein the fairing is disposed to diminish oscillations during flight of the fishing bobber.

18. The fishing bobber of claim 15 wherein the counterweight further includes at least one sleeve extending along the longitudinal axis.

19. The fishing bobber of claim 15 wherein the counterweight is disposed such that the attitude of the fishing bobber assumes an orientation wherein the forward portion is located forward of the rearward portion during flight of the fishing bobber.

20. The fishing bobber of claim 15 further comprising a fish strike indicator oriented substantially along the longitudinal axis wherein the fish strike indicator projects forward from the forward portion.

* * * * *